United States Patent [19]

Folmar et al.

[11] 4,008,033
[45] Feb. 15, 1977

[54] EXTRUSION MASK

[75] Inventors: Robert G. Folmar; Robert V. VanDewoestine, both of Corning, N.Y.

[73] Assignee: Corning Glass Works, Corning, N.Y.

[22] Filed: Oct. 7, 1975

[21] Appl. No.: 620,360

[52] U.S. Cl. .............................. 425/467; 425/380
[51] Int. Cl.$^2$ .......................................... B29F 3/04
[58] Field of Search ......... 425/190, 191, 192, 197, 425/198, 199, 382, 382.2, 463, 464; 264/176 R, 176 F

[56] References Cited

UNITED STATES PATENTS

| | | | |
|---|---|---|---|
| 3,836,302 | 9/1974 | Kaukeinen | 425/197 |
| 3,857,989 | 12/1974 | King | 425/382 R X |
| 3,947,214 | 3/1976 | Cunningham | 425/467 |

Primary Examiner—Francis S. Husar
Assistant Examiner—Mark Rosenbaum
Attorney, Agent, or Firm—Burton R. Turner; Clarence R. Patty, Jr.

[57] ABSTRACT

A mask or face plate, having an orifice or opening formed therethrough of desired size and configuration, is positioned against the discharge face of an extrusion die. The mask restricts the flow of extrudable material through the die so that such material will conform to the size and configuration of the opening or orifice formed through the mask. The face of the mask adjacent the discharge face of the extrusion die is provided with an offset or stepped portion which surrounds the orifice formed through the mask and extends radially outwardly therefrom in a plane extending perpendicular to the axis or direction of extrusion. Preferably the offset planar face is radiused at its juncture with the orifice. The offset or stepped mask has particular utility when utilized with an extrusion die for forming cellular or honeycomb structures, in that the gap formed by the predetermined offset meters a controlled flow of additional batch material from the offset portion to the outer boundaries of the extruded honeycomb article passing through the orifice in said mask to encapsulate the honeycomb structure with a smooth uniform skin with improved selections.

4 Claims, 3 Drawing Figures

EXTRUSION MASK

BACKGROUND OF THE INVENTION

This invention pertains to the art of manufacturing extruded articles from extrudable material such as ceramic batches and similar materials which have the property of being able to flow or plastically deform during extrusion, while being able to become sufficiently rigid immediately thereafter so as to maintain their structural integrity. More particularly, the present invention relates to an improved extrusion die mask utilized in conjunction with an existing extrusion die, for not only providing such extrusion die with greater versatility, but also for improving skin characteristics about cellular or honeycomb articles which may be extruded by such die. The extrusion die may be virtually any known construction, however the extrusion die mask of the present invention has particular application with respect to extrusion dies having multiple core pins for forming cellular or honeycomb structures, such as disclosed in U.S. Pat. No. 3,790,654. That is, such extrusion dies for making honeycomb structures necessitate the formation of numerous core pins, and accordingly the manufacture of such dies is not only very complex but very costly. Further, every time a honeycomb structure having a new size or shape is required, it necessitates the burdensome manufacture of an additional new costly die. Not only does this require the maintenance of a relatively large inventory of extrusion dies with different sizes and configurations, but also many of such dies become obsolete as size and shape requirements are varied.

U.S. Pat. No. 3,836,302 discloses a mask or face plate for overlying a portion of a discharge face of an extrusion die so as to provide such die with greater flexibility and variability. The mask of said invention did in fact function satisfactorily to provide extrusion dies with greater flexibility and variability, and when such mask was utilized with dies for forming honeycomb structures, it also provided an integral skin or casing about such structures. However, during the formation of the skin about the honeycomb structures, the mask had a tendency to crush peripheral cells as the structure passed through the central opening of the mask. Further, the surface of the skin produced by such mask had a tendency to be fairly rough, and was not of a character to provide a high degree of isostatic crushing strength.

An improved extrusion die mask is disclosed in copending patent application Ser. No. 532,362, now U.S. Pat. No. 3,947,214 assigned to the assignee of this application, and includes a recessed reservoir and a flow control or metering gap in its inlet face for forming a substantially smooth integral skin about a honeycomb article without causing peripheral cell distortion and with improved isostatic crushing strengths.

The present invention has not only overcome the problems of rough skin texture and peripheral cell distortion which were encountered with the prior art devices, but also provides a more easily manufacturable extrusion die mask which results in better product selection than that obtainable with the mask of said copending application.

SUMMARY OF THE INVENTION

In its simplest form, the present invention is directed to a face plate or mask for overlying a portion of the discharge face of an extrusion die so as to provide an article extruded by such die with an integral skin of desired thickness, texture, and with improved product selection.

The invention has particular application for use with extrusion dies for forming thin walled cellular or honeycomb structures which are provided with an integral shell or casing about the honeycomb network. Cellular or honeycomb structures refer to any structure having a plurality of openings or passages of any desired size or shape extending therethrough, and the present invention provides the advantage of being able to form a plurality of such structures with different sizes and shapes from a single extrusion die while simultaneously providing a bounding wall or shell about the desired shape with a predetermined thickness and surface texture.

The mask or face plate of the present invention has a blocking surface positioned adjacent the discharge surface of an extrusion die so as to block or mask-off the discharge flow of extrudable material which would normally flow through the masked-off portion of the extrusion die. An opening or orifice of desired size and configuration is formed centrally through the mask such that the inlet end of such orifice is in direct communication with the discharge face of the extrusion die. An annular stepped or offset surface portion is formed in the blocking surface about the orifice, and preferably communicates with an inlet portion of the orifice by means of an arc or radiused intersection.

Since the mask has particular utility when utilized with extrusion dies for forming honeycomb structures by providing an integral skin thereabout, the depth of the offset or stepped surface which forms a gap between the mask and the discharge surface of the extrusion die, is of great significance in view of the fact that the gap depth is proportional to the thickness of the skin applied about the outer periphery of the honeycomb article. Accordingly, batch material extruded adjacent the periphery of the inlet end of the orifice is received by the offset or stepped portion and controllably fed by means of its predetermined gap to a radiused inlet portion of the orifice for forming a skin about the extruded honeycomb article passing therethrough. The mask will also function with a non-radiused or right angle intersection with said orifice, however the thickness and quality of the skin appears to be improved with a radiused intersection. Masks of the present invention are removably mounted to the die structure so as to be readily interchangeable with different extrusion dies, thus providing a greater degree of flexibility in their utilization.

It thus has been an object of the present invention to provide a novel extrusion die mask for existing extrusion dies so as to provide greater flexibility and variability in the dies and configurations of the extruded product which may be formed from such dies.

A further object of the present invention has been to provide a novel means for utilizing existing extrusion dies which form honeycomb structures, to form such structures with different sizes and configurations while simultaneously forming a substantially smooth integral skin or casing there about without materially distorting peripheral cells about the honeycomb structure and while maintaining the roundness of the outer periphery.

DESCRIPTION OF THE PREFERRED EMBODIMENTS

Figure 1:
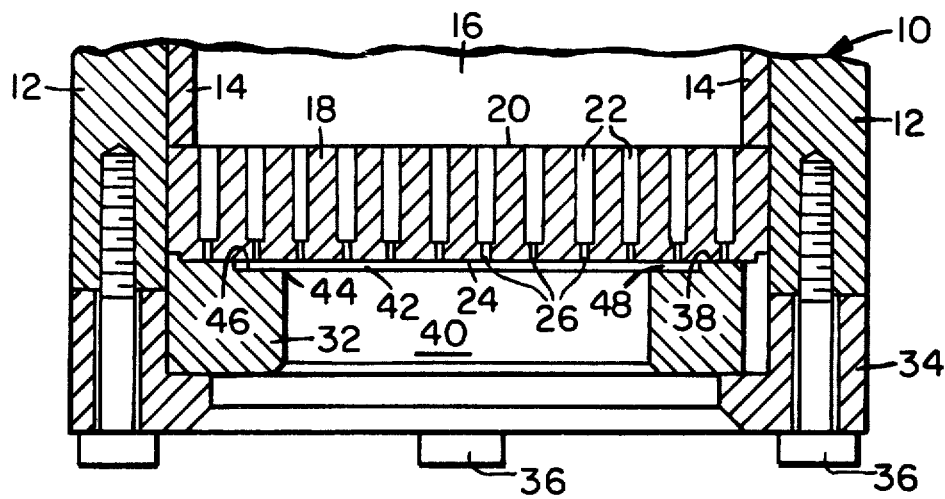
FIG. 1 is an elevational view in section of an extrusion die assembly including the extrusion die mask of the present invention.

Referring now to the drawings, particularly FIG. 1, an extrusion die apparatus 10 is shown including a support structure 12 for a cylinder 14, housing an extrusion chamber 16. An extrusion die 18 of any desired configuration is positioned adjacent the outlet end of the extrusion chamber 16. Since the present invention has particular application with respect to extrusion dies for forming honeycomb structures, such a die is shown for purposes of illustration. The die body 18 has an inlet face 20 provided with a plurality of openings or feed passageways 22 and an outlet face 24 which may be provided with a plurality of interconnected discharge slots 26. The feed passageways 22 communicate with selected areas of the discharge slots 26 so as to deliver the batch material from the extrusion chamber 16 to the discharge slots 26. The interconnected discharge slots 26 form a grid work through which the batch material is extruded to form the matrix of the coherent honeycomb structure.

Figure 3:
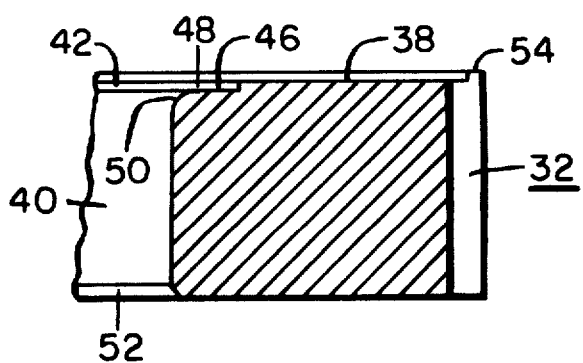
FIG. 3 is an enlarged fragmental elevational view partially in section taken along line 3—3 of FIG. 2.

An extrusion die mask 32 is positioned adjacent the outlet face 24 of the extrusion die 18 and is removably secured in position adjacent the outlet face by means of a retaining ring 34 and a plurality of bolts or tap screws 36. The mask 32 has a blocking surface 38 which is positioned adjacent to the outlet face 24 of the die 18 and surrounds a central opening or orifice 40 of desired size and configuration extending through the mask 32. An annular offset or stepped portion 42 is formed in the blocking surface 38 about an inlet portion 44 of orifice 40. The offset or stepped portion 42 includes a planar surface 46 extending radially outwardly from the inlet portion 44 of orifice 40 and forming a gap 48, equal to the depth of the offset, between the outlet face 24 of the extrusion die 18 and the die mask 32. The planar surface 46 preferably lies within a plane extending perpendicular to the axis of extrusion through orifice 40, and communicates with said orifice through a circular arc or a radiused intersection 50 (see FIG. 3).

Whereas the blocking surface 38 restricts the flow of extrudable material through the die 18 to those areas of such die which are in open communication with the orifice 40, the annular offset or stepped portion 42 provides a supply of batch material which is controllably fed by the predetermined gap 48 to the orifice 40 for forming a skin about the honeycomb article extruded through die 18. The orifice 40 may have a chamfered outlet end 52 to avoid burring at the outlet which might prevent a smooth withdrawal of the extruded article. Further, a peripheral positioning rim 54 may be formed on blocking surface 38 and a keyway 56 may be formed in the periphery thereof for positioning and aligning the mask 32 on the die 18.

Although a continuous curved or radiused intersection 50 is preferred for facilitating the flow of batch material from the stepped portion 44 into the orifice 40 for forming a uniform smooth skin about the outer boundary of the honeycomb article extruded by die 18 and passed through orifice 40, a right-angled intersection did in fact function to provide an adequate but thin skin about the extruded honeycomb article. The thickness of the skin formed on the honeycomb article is controlled by the gap depth 48 and the radius of intersection 50. That is, by increasing the radius of intersection 50 and/or increasing the offset or stepped portion 40, which increases the gap depth, a thicker skin or outer casing can be provided about the extruded article; whereas, a reduction in the stepped portion which inherently reduces the depth of the gap 48, and/or a reduction in the radius 50 will produce a thinner skin. Although experimentation has by no means been exhausted, gap depths from about 0.005 inch to about 0.030 inch have produced excellent results with skin thickness being proportionately varied. The radial length of the planar surface 46 of the offset portion 42 should be at least 10 times the gap depth so as to provide for adequate flow of batch material to the orifice 40 for forming the integral skin about the extruded honeycomb structure. As previously mentioned, the intersection 50 is preferably radiused so as to provide a more substantial and coherently uniform smooth outer skin about the extruded article, even though a right angle intersection did provide acceptable product. Various radiuses may be utilized from a right angle or a zero radius up to about 0.06 inch and beyond. We have a found that a radius of about 0.04 inch produces excellent results, whereas radiuses above about 0.06 inch have a tendency to collapse peripheral cells and form thicker skins.

In view of the fact that the die mask of the present invention basically merely includes a central orifice and an offset or stepped portion in the blocking surface, the mask is relatively simple and inexpensive to manufacture compared with the compound orifice of the prior art masks and the required reservoir areas of the mask of said copending application. Accordingly, with the mask of the present invention it is possible to provide improved skin characteristics about honeycomb articles while minimizing out of roundness and obtaining higher selection rates than that obtained with the mask of said copending application. In fact, using substantially identical batch compositions and extrusion procedures, it has been found that through the utilization of the mask of the instant invention, over that of said copending application, selection rates have increased by as much as about 10%.

Figure 2:
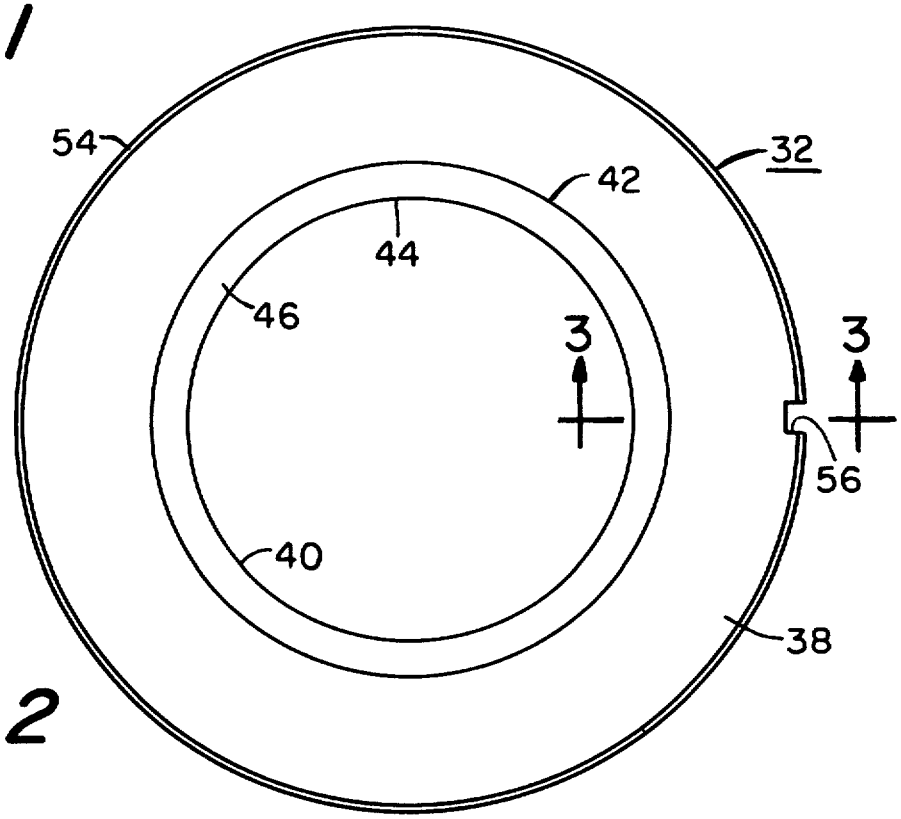
FIG. 2 is a top plan view of the mask shown in FIG. 1.

Although the orifice 40 is shown in FIG. 2 in the shape of a circle, the size and configuration thereof may be varied as desired, and may include virtually any geometric shape such as oval, square, triangular, elliptical, etc. Further, it will be appreciated that the various dimensions of the orifice may vary considerably with the material being extruded, however, the following specific example is given as an illustration for extruding a clay type of material. A steel mask was formed with a circular orifice having a diameter of about 5 inches communicating with a blocking surface having a diameter of about 9 inches. An offset or stepped portion was formed in the blocking surface to a gap depth of about 0.01 inch which formed a planar surface extending perpendicular to the axis of the orifice and having a diameter of about 6 inches concentrically with said orifice. Thus, the planar surface extended radially outwardly about the orifice a distance of about ½ inch. The intersection between the planar surface and the orifice at the inlet portion of the orifice was provided with a radius of about 0.04 inch. Clay material was extruded through a known honeycomb die and passed through the circular orifice of the mask, with peripheral portions of the extruded material being received within the stepped portion and flown therealong to the radiused intersection to form a cylindrical honeycomb structure having a smooth integral outer skin with a thickness of about 0.02 inch – 0.03 inch. The cells about the periphery of the extruded article were not deformed and were virtually identical to interior cells, with the result that product selection from the die was very favorable.

It is to be understood that the foregoing example merely sets forth a now preferred embodiment, whereas the stepped portion or gap and the radiused intersection may be varied as desired to produce a predetermined skin thickness. Therefore, although the now preferred embodiments of the invention have been set forth, it will be apparent to those skilled in the art that various changes and modifications may be made thereto without departing from the spirit and scope thereof as defined in the appended claim.

We claim:

1. An extrusion mask for use in combination with die means for forming honeycomb structures which comprises, a mask having a blocking surface for blocking off selected portions of the outlet face of an extrusion die for forming honeycomb structures, said mask having an orifice extending longitudinally through said mask and communicating at an inlet end with said blocking surface for receiving an extruded honeycomb article therethrough, offset means formed in said blocking surface radially outwardly of said orifice and communicating with the outlet face of said extrusion die, said offset means including a substantially planar surface lying within a plane substantially perpendicular to a longitudinal axis through said orifice, said orifice having wall portions extending substantially parallel to said axis, said orifice wall portions joining said planar surface through a continuous curve portion, and said planar surface being offset from said blocking surface with a predetermined gap distance.

2. An extrusion mask as defined in claim 1 wherein said offset means includes means for predetermining the thickness of said skin on said honeycomb article.

3. An extrusion mask as defined in claim 1 wherein said substantially planar surface joins said wall portions of the orifice through a circular arc.

4. An extrusion mask as defined in claim 1 wherein said substantially planar surface extends radially outwardly from said orifice a distance equal to at least ten times the gap thickness of said offset means.

* * * * *